United States Patent
Nakajima

(10) Patent No.: US 7,679,650 B2
(45) Date of Patent: Mar. 16, 2010

(54) IMAGE-CAPTURING SYSTEM AND IMAGE-CAPTURING METHOD

(75) Inventor: Nobuyoshi Nakajima, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 986 days.

(21) Appl. No.: 11/303,920

(22) Filed: Dec. 19, 2005

(65) Prior Publication Data
US 2006/0158544 A1 Jul. 20, 2006

(30) Foreign Application Priority Data
Dec. 20, 2004 (JP) .............................. 2004-368365

(51) Int. Cl.
*H04N 5/232* (2006.01)
*H04N 7/18* (2006.01)
(52) U.S. Cl. .................. 348/211.99; 348/143
(58) Field of Classification Search ......... 348/114–116, 348/143, 211.2, 211.99, 211.12, 208.14, 348/43, 144, 151, 153–155, 157–159
See application file for complete search history.

(56) References Cited

U.S. PATENT DOCUMENTS 5,929,904 A * 7/1999 Uchida .................... 348/211.7
6,459,388 B1 * 10/2002 Baron ........................ 340/996
6,919,921 B1 * 7/2005 Morota et al. ........... 348/211.11
6,950,535 B2 * 9/2005 Sibayama et al. ............ 382/113
2001/0048815 A1 * 12/2001 Nakajima et al. ............ 396/310
2002/0093575 A1 * 7/2002 Kusaka ........................ 348/233
2003/0043283 A1 * 3/2003 Yamamoto ............... 348/231.3
2004/0109199 A1 * 6/2004 Tsubaki ...................... 358/1.15
2006/0055790 A1 * 3/2006 Chen et al. ................ 348/211.2

FOREIGN PATENT DOCUMENTS

JP 2002-24229 A 1/2002

* cited by examiner

*Primary Examiner*—Lin Ye
*Assistant Examiner*—Euel K Cowan
(74) *Attorney, Agent, or Firm*—Birch, Stewart, Kolasch & Birch, LLP

(57) ABSTRACT

An image-capturing system having a function of allowing the user to easily find the position of an image-capturing device is provided. An image-capturing system includes: an image-capturing unit; an image storage unit for storing a camera position image taken toward the image-capturing unit from an image-capturing region taken by the image-capturing unit; and a remote control unit which allows the user to perform operation for remote control of the image-capturing unit. With such an arrangement, the remote control unit includes a reception unit for receiving the camera position image stored in the image storage unit, and a display unit for displaying the camera position image received by the reception unit. The remote control unit further includes an image-capturing request unit for making a request to the image-capturing unit for image capturing.

13 Claims, 6 Drawing Sheets

IMAGE-CAPTURING SYSTEM AND IMAGE-CAPTURING METHOD

BACKGROUND OF THE INVENTION

1. Field of the Invention

The present invention relates to an image-capturing system and an image-capturing method.

In particular, the present invention relates to an image-capturing system for capturing an image and an image-capturing method thereof.

2. Related Art

As conventional systems including a camera installed in amusement parks and so forth for capturing an image, an image-capturing system has been known which has a function of capturing an image upon detection of a subject approaching the camera within a predetermined distance therefrom, based upon airwaves transmitted from a transmitter carried on the subject as disclosed, for example, in Japanese Unexamined Patent Application Publication No. 2002-24229.

In general, cameras installed an amusement parks and so forth are preferably installed in a less conspicuous manner for visitors in an amusement park and so forth from the perspective of scenery.

However, this leads to a tradeoff problem that the visitors in the amusement park and so forth cannot readily find the camera.

Accordingly, it is an object of the present invention to provide an image-capturing system and an image-capturing method for solving the aforementioned problems.

SUMMARY OF THE INVENTION

The aforementioned object is realized by a combination of features described in the independent claims.

Furthermore, dependent claims provide specific arrangements having further advantages.

An image-capturing system according to a first aspect of the present invention includes: an image-capturing unit; an image storage unit for storing a camera position image taken toward the image-capturing unit from an image-capturing region taken by the image-capturing unit; and a remote control unit which allows the user to perform operation for remote control of the image-capturing unit. With such an arrangement, the remote control unit includes a reception unit for receiving the camera position image stored in the image storage unit, and a display unit for displaying the camera position image received by the reception unit.

The remote control unit may further include an image-capturing request unit for making a request to the image-capturing unit for image capturing.

The image-capturing system may further include a position information storage unit for storing information regarding the position of the image-capturing unit in the camera position image. With such an arrangement, the reception unit may further receive the information regarding the position of the image-capturing unit stored in the position information storage unit. Furthermore, the display unit may display the position of the image-capturing unit based upon the information received by the reception unit, superimposed upon the camera position image received from the reception unit.

The image storage unit may store the camera position image including a display indicating the position of the image-capturing unit, superimposed upon an image taken toward the image-capturing unit from the image-capturing region.

The image-capturing system may further include an antenna unit for transmitting the camera position image stored in the image storage unit to the remote control unit in the form of a wireless signal. With such an arrangement, the antenna unit may be installed so as to enable transmission of the camera position image to the remote control unit which is present at a position where the user can visually confirm at least a part of an object included in the camera position image, in the form of a wireless signal.

The antenna unit may be installed in the image-capturing region.

An image-capturing method according to a second aspect of the present invention comprises: a step in which an image-capturing unit captures an image; a step in which an image storage unit stores a camera position image taken toward the image-capturing unit from an image-capturing region taken from the image-capturing unit; and a remote-control step which allows the user to perform operation for remote control of the image-capturing unit. With such an arrangement, the remote-control step includes a step in which a reception unit receives the camera position image stored in the image storage unit, and a step for displaying the camera position image received by the reception unit.

Note that the summary of the present invention described above is not a precise list including all the features required for the present invention. Also, various sub-combinations of the aforementioned features are also encompassed in the present invention.

The present invention provides an image-capturing system which allows the user to find the position of an image-capturing device.

DETAILED DESCRIPTION OF THE INVENTION

Description will be made below regarding the present invention with reference to the following embodiments. It should be understood that the present invention within the scope of the appended claims is not intended to be limited to the embodiments described below. Furthermore, all the combinations of the features described in the embodiments are not necessarily indispensable to the solving means of the present invention.

Figure 1:
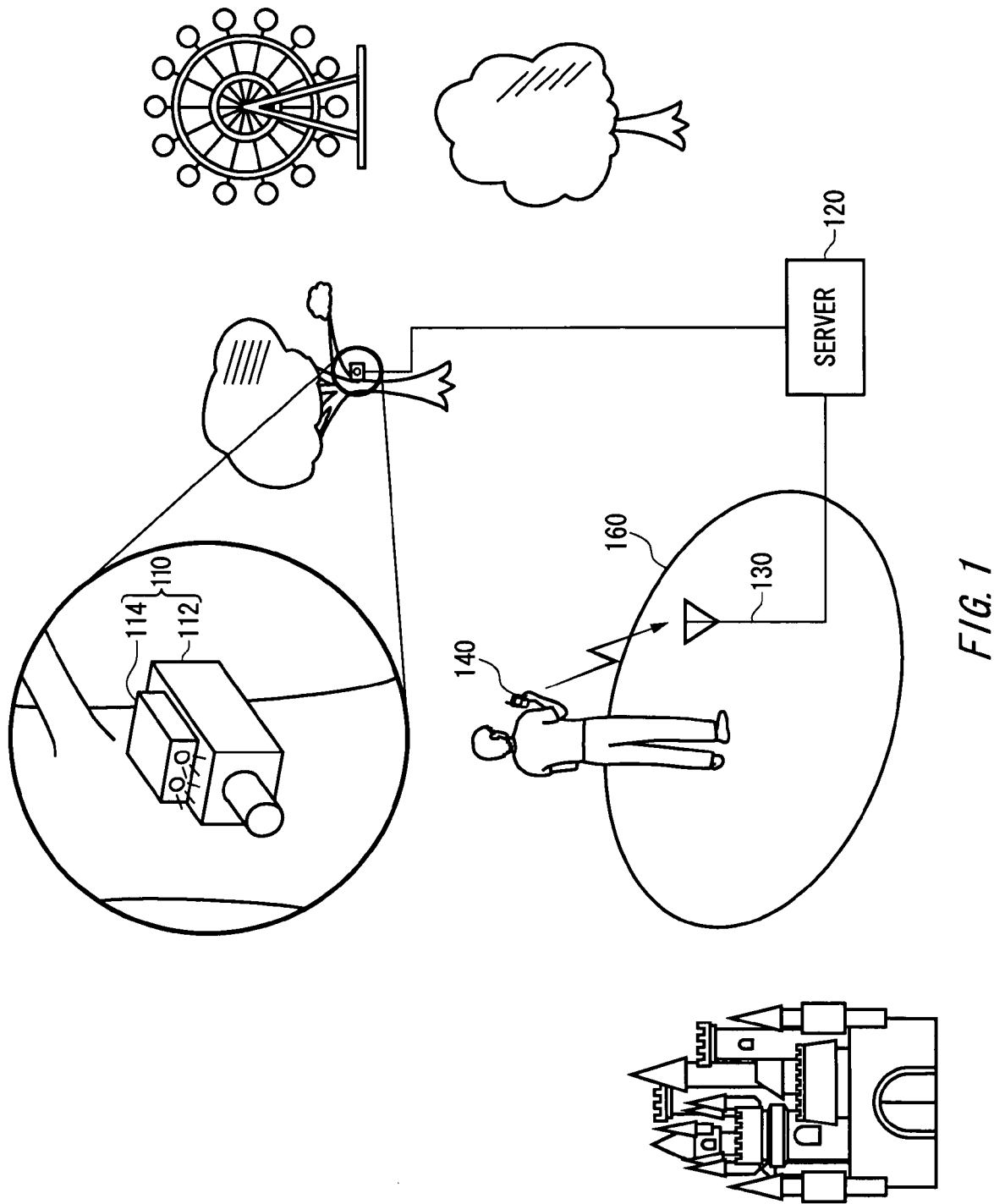
FIG. 1 is a diagram which shows an example of an application of an image-capturing system.

FIG. 1 shows an example of an application of an image-capturing system according to an embodiment of the present invention.

The image-capturing system provides a service for taking an image of the user who is a visitor in an amusement park, for example.

An image-capturing device 110 is installed at a position which allows taking of an image of the user with a castle which is one of the attractions of the amusement park as a background. Furthermore, the image-capturing device 100 is installed behind a tree in a less conspicuous manner for the visitors in the amusement park.

The image-capturing device 110 includes an image-capturing unit 112 for capturing an image of the user, and a light-emission unit 114 for emitting light so as to notify the user of the position of the image-capturing unit 112.

The remote control terminal 140 receives an image, which shows the position of the image-capturing unit 112 as viewed from the region taken the image-capturing unit 112, from a server 120 through an antenna unit 130, according to instructions from the user.

Then, the requested image is displayed on the remote control terminal 140.

The user moves to the position where the user can receive photography service from the image-capturing unit 112, with a Ferris wheel or the like, which is a part of the image showing the position of the image-capturing device 112, as a landmark.

Then, the user controls the light-emission unit 114 so as to cast illumination light onto an image-capturing area 160 where the image-capturing unit 112 provides photography service, using the remote control terminal 140.

Upon reception of an signal from the remote control terminal 140 through the antenna unit 130, the server 120 instructs the light-emission unit 114 to perform light emission.

Then, the user moves to the image-capturing area 160 where the light emitted from the light-emission unit 114 can be visually recognized.

Then, the user instructs the image-capturing unit 112 to capture an image of the user using the remote control terminal 140.

The server 120 stores the image captured by the image-capturing unit 112, in a directory correlated with the remote control terminal 140.

Then, the user receives the image stored in the server 120 at the exit of the amusement park.

Also, the server 120 may transmit the image stored therein to the remote control terminal 140 through the antenna unit 130, thereby providing the image to the user.

Note that the remote control terminal 140 may transmit a signal for instructing the image-capturing unit 112 to capture an image through infrared communication, wireless LAN, the Internet, or the like.

Also, the remote control terminal 140 may be a user's own mobile information terminal such as a cellular phone or the like. Also, the remote control terminal 140 may be a mobile terminal rented or borrowed from the amusement park.

The image-capturing system according to the present embodiment allows the user to easily find the position of the image-capturing device 110 installed in the amusement park and the region where the user can receive photography service from the image-capturing device 110.

Furthermore, the image-capturing system according to the present embodiment allows the user to take an image with a desired composition.

Figure 2:
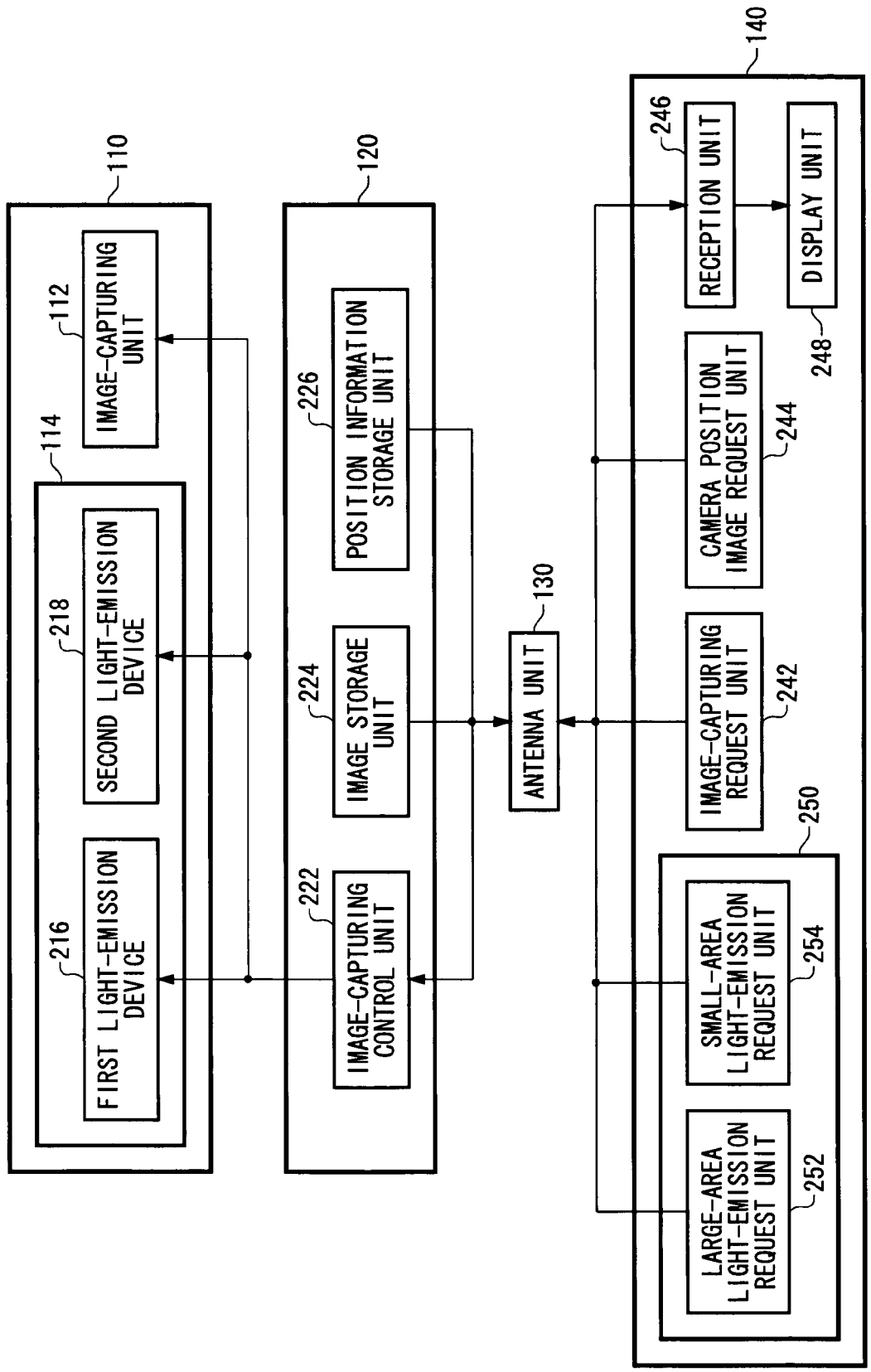
FIG. 2 is a diagram which shows an example of a block configuration of the image-capturing system.

FIG. 2 shows an example of a block configuration of the image-capturing system.

The image-capturing system includes the image-capturing device 110, the server 120, the antenna unit 130, and the remote control terminal 140.

The remote control terminal 140 includes a light-emission request unit 250, an image-capturing request unit 242, a camera-position image request unit 244, a reception unit 246, and a display unit 248.

The light-emission request unit 250 includes a large-area light-emission request unit 252 and a small-area light-emission request unit 254.

On the other hand, the image-capturing device 110 includes the light-emission unit 114 and the image-capturing unit 112.

The light-emission unit 114 includes a first light-emission device 216 and a second light-emission device 218.

On the other hand, the server 120 includes an image-capturing control unit 222, an image storage unit 224, and a position-information storage unit 226.

The antenna unit 130 receives a signal output from the remote control terminal 140 by wireless communication, and transmits the signal to the server 120.

Upon reception of a signal for controlling the image-capturing device 110, the server 120 transmits the signal thus received, to the image-capturing device 110 through the image-capturing control unit 222.

Furthermore, the server 120 transmits a signal to the remote control terminal 140 from the antenna unit 130 by wireless communication.

The image-capturing request unit 242 makes a request to the image-capturing unit 112 for capturing an image according to the image-capturing instruction from the user. The image-capturing unit 112 captures an image according to the image-capturing request from the image-capturing request unit 242.

Specifically, the image-capturing unit 112 receives light from the subject using an image-capturing device such as a CCD or the like, thereby capturing an image of the subject.

The light-emission request unit 250 makes a request to the light-emission unit 114 for light emission according to the light-emission instruction from the user.

The large-area light-emission request unit 252 makes a request to the light-emission unit 114 for casting illumination light onto a larger region than the image-capturing region where the image-capturing unit 112 provides photography service.

On the other hand, the small-area light-emission request unit 254 makes a request to the light-emission unit 114 for casting illumination light onto the approximately the same region as the image-capturing region where the image-capturing unit 112 provides photography service, or a smaller region than the image-capturing region.

The light-emission unit 114 is installed at approximately the same position as that of the image-capturing unit 112. The light-emission unit 114 casts illumination light onto the image-capturing region where the image-capturing unit 112 provides photography service.

Specifically, the light-emission unit 114 casts illumination light from the second light-emission device 218 onto a region which includes the image-capturing region where the image-capturing unit 112 provides photography service, and which is larger than the image-capturing region, according to a request from the large-area light-emission request unit 252.

Furthermore, the light-emission unit 114 casts illumination light from the first light-emission device 216 toward approximately the same region as the image-capturing region where the image-capturing unit 112 provides photography service, or a smaller region than the image-capturing region, according to a request from the small-area light-emission request unit 254.

The camera-position image request unit 244 makes a request to the server 120 for transmitting an image showing the camera position.

The image storage unit 224 stores the camera-position image taken toward the image-capturing unit 112 from the image-capturing region where the image-capturing unit 112 provides photography service.

Then, the image storage unit 224 transmits the camera-position image to the remote-control terminal 140 according to the request from the camera-position image request unit 244.

Note that the image storage unit 224 may store the camera-position image in which a mark for indicating the position of the image-capturing unit 112 has been superimposed upon the image taken toward the image-capturing unit 112 from the image-capturing region. Furthermore, the image storage unit 224 may transmit the camera position image including the mark indicating the position of the image-capturing unit 112 in the form of an image superimposed thereupon according to a request from the remote control terminal 140.

The position information storage unit 226 stores information regarding the position of the image-capturing unit 112 in the aforementioned camera-position image.

Then, the position information storage unit 226 transmits the information regarding the position of the image-capturing unit 112 to the remote control terminal 140 according to a request from the camera-position image request unit 224.

Specifically, the position information storage unit 226 stores the coordinates of the position of the image-capturing unit 112 in the camera-position image.

Note that the camera position image stored in the image storage unit 224 and the information regarding the camera position stored in the position information storage unit 226 are transmitted to the remote control terminal 140 through the antenna unit 130 in the form of a wireless signal.

The reception unit 246 receives the camera position image stored in the image storage unit 224 and the information regarding the position of the image-capturing unit 112 stored in the position information storage unit 226.

The display unit 248 displays the camera-position image received by the reception unit 246.

Furthermore, the display unit 248 displays a mark which indicates the position of the image-capturing unit 112, in the form of an image superimposed upon the aforementioned camera-position image, based upon the information regarding the position of the image-capturing unit 112 received by the reception unit 246.

Note that, of the components of the image-capturing system, only the image-capturing device 110 needs to be installed at the position which allows itself to capture an image of the subject. With such an arrangement, the server 120 may be installed at a remote position from the image-capturing device 110. Also, the server 120 may be a personal computer or the like.

Also, the remote control terminal 140 may be a mobile terminal carried on the user for instructing the image-capturing device 110 to capture an image. Also, the remote-control terminal 140 may be fixed near the region where the image-capturing device 110 provides photography service.

The image-capturing system according to the present embodiment notifies the user of the region where the photography service is provided, by illuminating the region using the light-emission unit 114, thereby providing photography service to the user in a sure manner.

Furthermore, with the image-capturing system according to the present embodiment, the user receives the camera position image taken toward the image-capturing unit 112 from the image-capturing region where the image-capturing unit 112 provides photography service, and the information regarding the camera position in the camera-position image. This allows the user to find the position of the image-capturing device 100 as viewed from the image-capturing region.

This allows the user to take an image with a desired composition.

Figure 3:
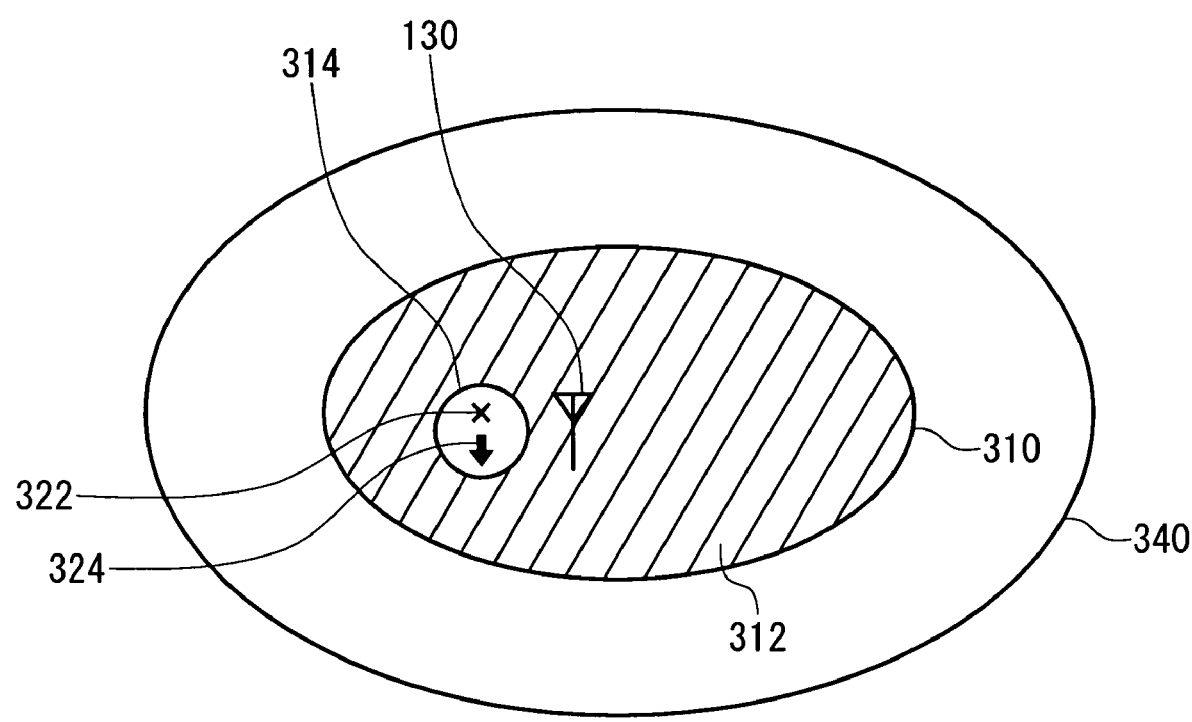
FIG. 3 is a diagram which shows an example of an illumination region.

FIG. 3 shows an example of an illumination region illuminated by the light-emission unit 114.

The second light-emission device 218 illuminates an illumination region 340 larger than an image-capturing region 312 where the image-capturing device 110 provides photography service.

The first light-emission device 216 illuminates an illumination region 310 which is approximately the same as the image-capturing region 312.

With such an arrangement, upon reception of a request from the user for casting illumination light onto the image-capturing region 312, the first light-emission device 216 illuminates the illumination region 314 which is smaller than and is included within the image-capturing region 312 where the user can receive photography service.

The first light-emission device 216 emits laser light having directionality with a viewing angle equal to or smaller than that of the image-capturing device 112, for example.

Furthermore, the first light-emission device 216 may emit light of different color from that of the illumination light cast onto the illumination region 310, onto the illumination region 314.

The second light-emission device 218 may emit laser light having directionality with a viewing angle equal to or greater than that of the image-capturing device 112, for example.

Furthermore, the second light-emission device 218 may emit light of different color from that of the light emit from the first light-emission device 216.

Note that each of the first light-emission device 216 and the second light-emission device 218 emits light in the visible wavelength range.

Also, the first light-emission device 216 and the second light-emission device 218 may cause the light emitted therefrom to blink, thereby attracting the attention of the user.

Each of the first light-emission device 216 and the second light-emission device 218 may be an LED.

Each of the first light-emission device 216 and the second light-emission device 218 may include multiple LEDs for emitting lights in different colors from one another, or for emitting lights in the same color.

Note that the antenna unit 130 is installed within the image-capturing region 312 so as to allow wireless communication with the remote control terminal 140 positioned near the image-capturing region 312.

Note that the antenna unit 130 may be installed under the ground within the image-capturing region, thereby providing an image without including the antenna unit 130.

Also, the antenna unit 130 may be installed out of the image-capturing region 312.

Specifically, the antenna unit 130 may be installed at any position which allows reception of a wireless signal from the remote control terminal 140 in a region where the user can visually confirm the light cast from the light-emission unit 114.

Also, the antenna unit 130 may be installed at any position which allows transmission of a camera-position image in the form of a wireless signal to the remote control terminal 140 in a region where the user can visually confirm at least a part of the object included in the camera-position image.

Note that the antenna unit 130 may be installed at a higher elevation than the ground, such as on the wall of a building and so forth.

Note that the illumination region 314 may include a position mark 322 that indicates the optimum image-capturing point where the system provides the optimum photography service to the user, and a direction mark 324 that indicates the optimum user facing direction, each of which is placed on the ground.

For example, the position mark is placed at a position which allows the image-capturing system to provide an image of the user standing at the position indicated by the position mark 322 with a castle without being obscured by the user in front thereof.

The direction mark 324 may be an arrow which indicates the direction from the position of the position mark 322 toward the image-capturing unit 112, for example.

Each of the position mark 322 and the direction mark 324 may be displayed on the ground using light emitted from the first light-emission device 216.

With such an arrangement, the user can visually confirm the light emitted from the second light-emission device 218, even if the user is outside of the image-capturing region 312. This notifies the user that he/she is near the image-capturing region 312.

Furthermore, with such an arrangement, the user can visually confirm the light cast on the illumination region 310 from the first light-emission device 216 before image capturing. This provides an image including the user in a sure manner.

Furthermore, such an arrangement allows the user to visually confirm the light cast on the illumination region 314 from the first light-emission device 216 before image capturing. This provides an image of the user standing at the image-capturing point in a sure manner.

Figure 4:
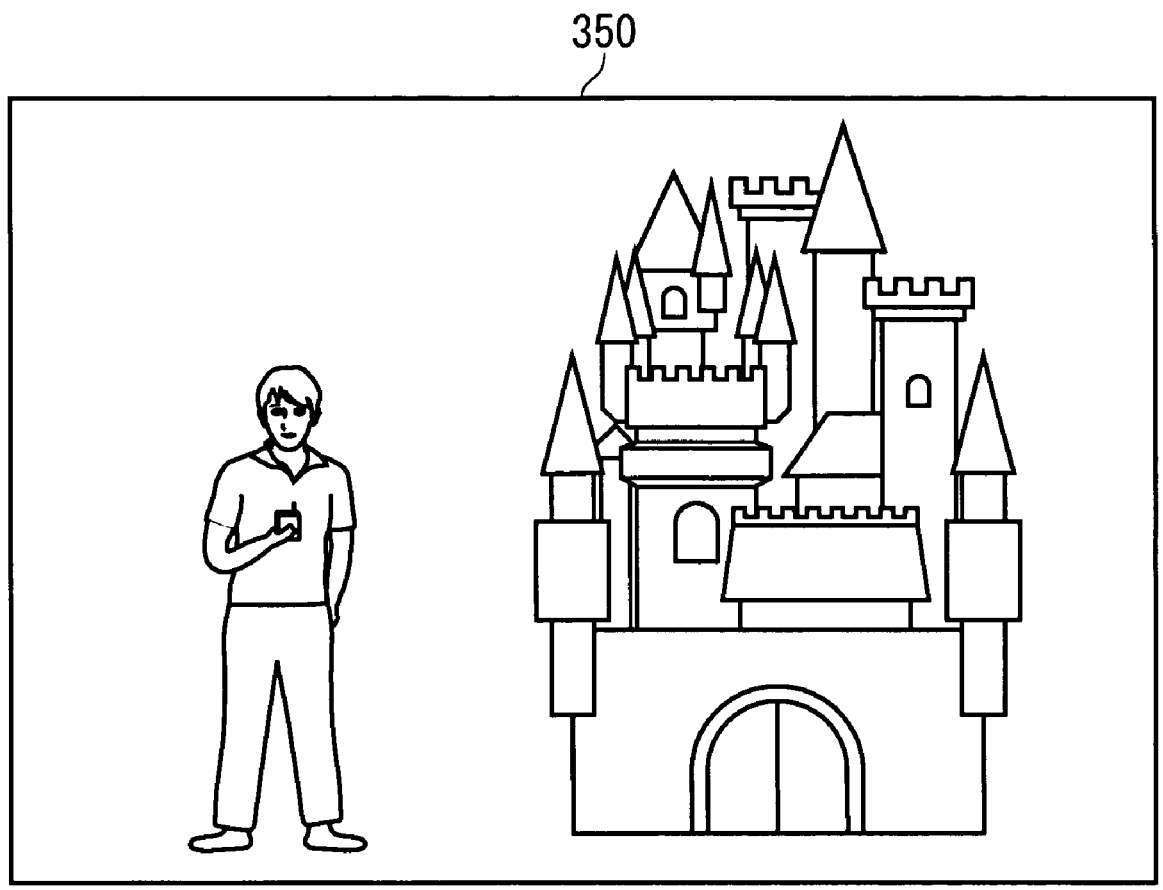
FIG. 4 is a diagram which shows an example of a captured image.

FIG. 4 is an example of a captured image 350 captured by the image-capturing device 110.

The present embodiment allows the user to obtain the captured image 350 including the user standing within the illumination region 314 with a castle as a background without being obscured the user in front thereof.

Furthermore, the present embodiment allows the user facing in the direction indicated by the direction mark 324 and standing on the position mark 322, each placed within the illumination region 314, to capture a more satisfactory image.

Figure 5:
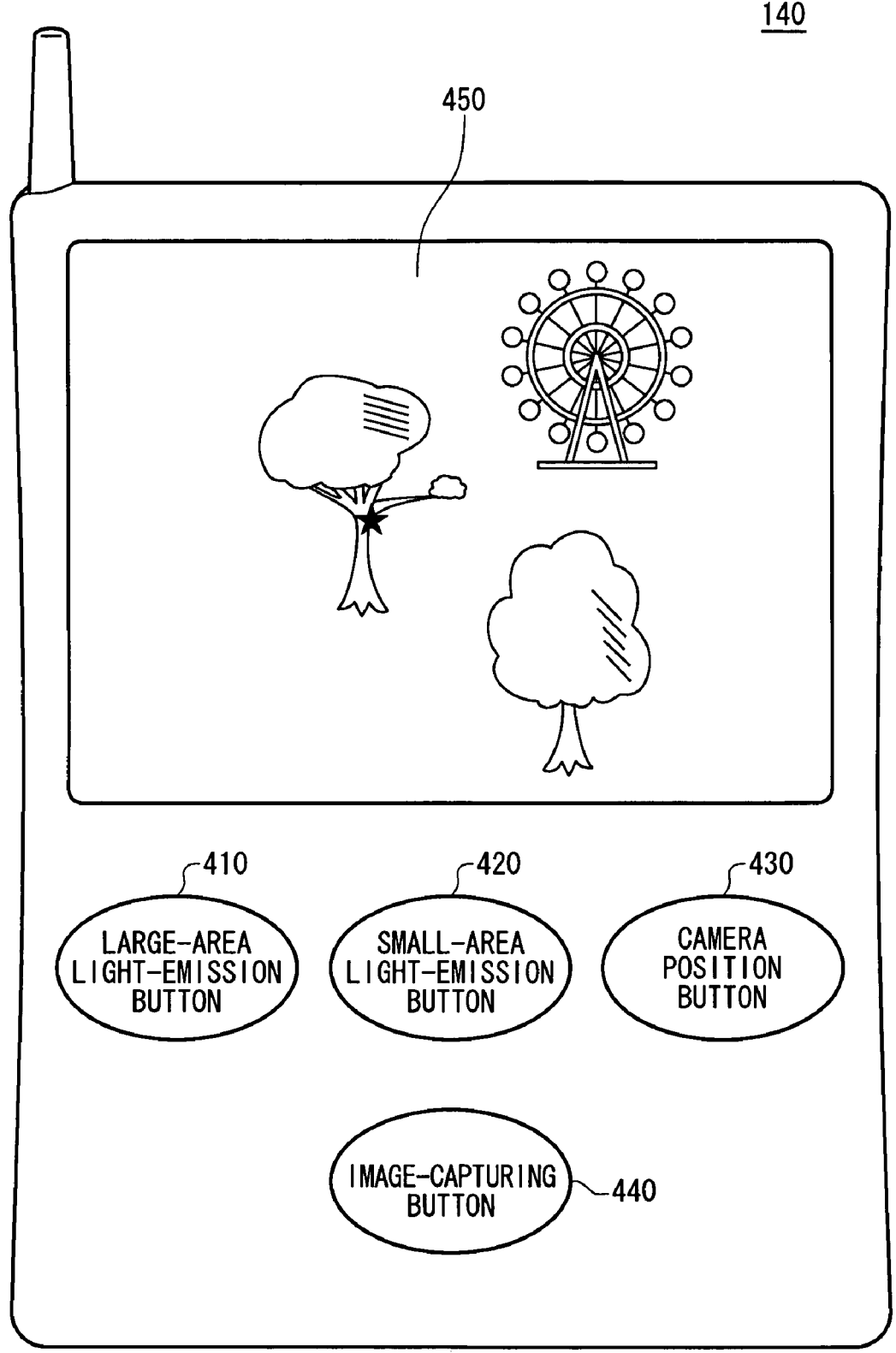
FIG. 5 is a diagram which shows an example of a remote control terminal 140.

FIG. 5 shows an example of the remote control terminal 140.

The remote control terminal 140 includes a large-area light-emission button 410, a small-area light-emission button 420, a camera-position button 430, an image-capturing button 440, and an image display screen 450.

Upon the user pressing the image-capturing button 440, the image-capturing request unit 242 instructs the image-capturing unit 112 to capture an image.

On the other hand, upon the user pressing the large-area light-emission button 410 or the small-area light-emission button 420, the light-emission request unit 250 instructs the light-emission unit 144 to perform light emission. Note that these actions are independent of the image-capturing instruction to the image-capturing unit 112.

On the other hand, upon the user depressing the camera position button 430, the image display screen 450 displays an image showing the position of the image-capturing unit 112.

Figure 6:
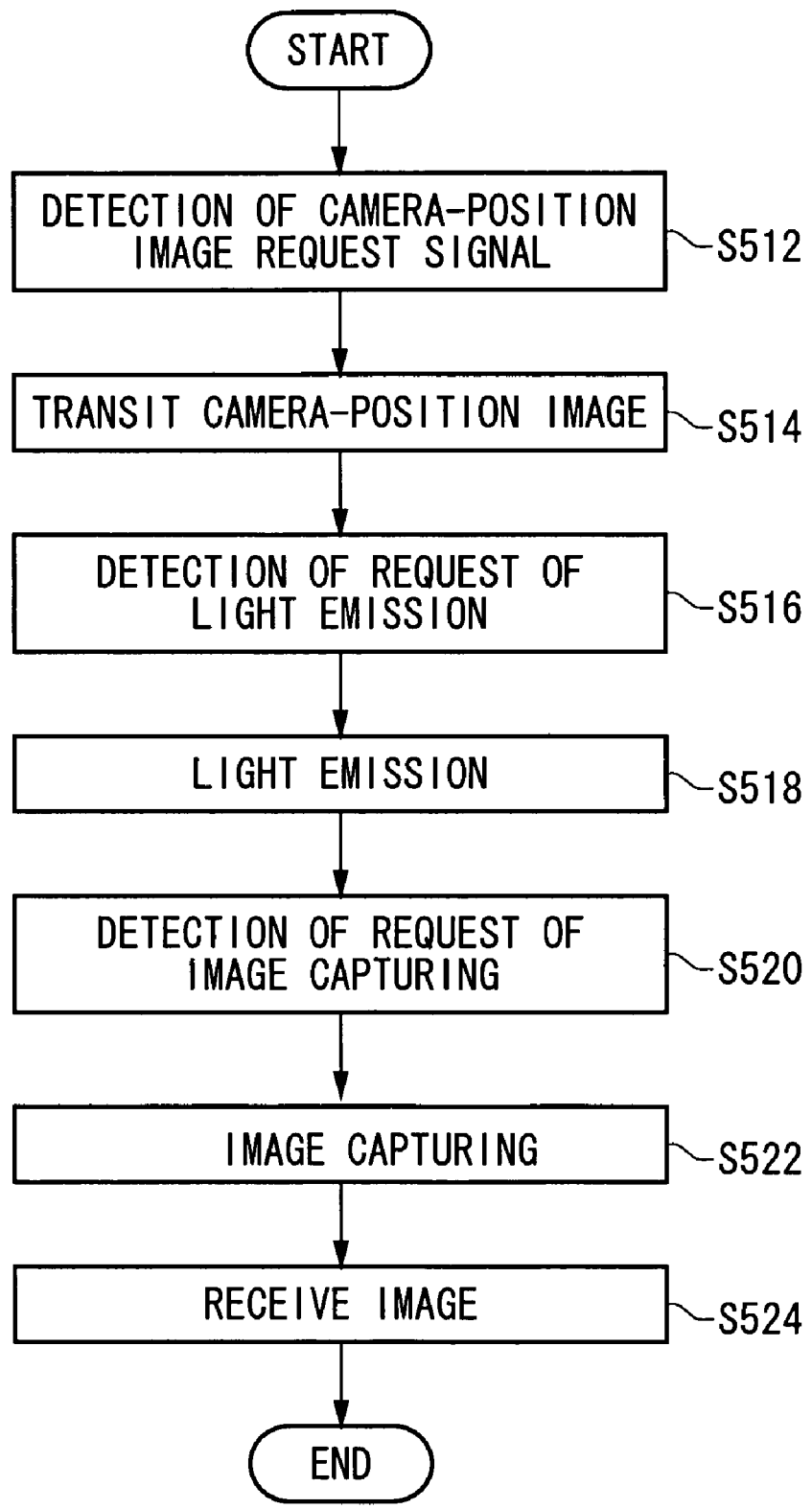
FIG. 6 is a flowchart which shows an example of the operation of the image-capturing system according to instructions from the user.

FIG. 6 is a flowchart which shows the operation of the image-capturing system according to instructions from the user using the remote control terminal 140.

First, the user presses the camera position button 430 so as to request a camera position image.

Upon detection of a signal for requesting the camera position image (S512), the server 120 transmits the camera position image stored in the image storage unit 224 and the information indicating the camera position stored in the position information storage unit 226 to the remote control terminal 140 (S514).

The remote control terminal 140 displays an image, in which a mark indicating the position of the image-capturing unit 112 is superimposed upon the camera position image received from the server 120, on the image display screen 450.

The user finds the image-capturing device 110 in the amusement park with a Ferris wheel or the like, which is included in the camera position image displayed on the image display screen 450, as a landmark. Then, the user moves to a roughly-indicated position where the image-capturing device 110 provides photography service.

Subsequently, the user presses the large-area light-emission button 410, or the small-area light-emission button 420.

Upon detection of a signal for requesting light emission (S516), the server 120 instructs the light-emission unit 114 of the image-capturing device 110 to perform light emission.

Note that upon the user pressing the large-area light-emission button 410, the second light-emission device 218 performs light emission. On the other hand, upon the user pressing the small-area light-emission button 420, the first light-emission device 216 performs light emission.

Then, the user moves to and enters the region where the image-capturing device 110 provides photography service, by following the illumination light emitted from the second light-emission device 218.

Alternatively, the user moves to the region where the image-capturing device 110 provides photography service, by following the illumination light emitted from the first light-emission device 216.

Following movement to the image-capturing point, the user determines the direction toward the image-capturing unit 112 based upon the image which shows the position of the image-capturing unit 112, and which is displayed on the image display screen 450.

Also, the user can determine the direction toward the image-capturing unit 112 by following the light emitted from the first light-emission device 216.

Subsequently, the user presses the image-capturing button 440 so as to capture an image.

Upon detection of a signal for requesting image capturing (S520), the server 120 instructs the image-capturing unit 112 to capture an image of the user (S522). The image thus captured is stored in the server 120.

The user receives the image captured by the image-capturing unit 112 from the server 120 (S524).

Note that an arrangement may be made in which the server 120 transmits the image captured by the image-capturing device 110 to the remote control terminal 140. With such an arrangement, the remote control terminal 140 may display the image thus received.

Also, an arrangement may be made in which the remote control terminal 140 stores the image thus received, thereby allowing the user to receive the image.

As described above, the image-capturing system according to the present embodiment allows the user to easily find the position of the image-capturing device 110 installed in the amusement park and the region where the user can receive photography service from the image-capturing device 110.

Furthermore, the present embodiment allows the user to easily find the optimum image-capturing point where the user receives the optimum photography service.

Furthermore, the present embodiment allows the user easily find the direction from the image-capturing region toward the image-capturing device 110.

Thus, the present embodiment allows the user to take an image with a desired composition.

While description has been made regarding the present invention with reference to the embodiments, the technical scope of the present invention is not restricted to the precise embodiments described above.

Various changes and modifications of the aforementioned embodiments may be made.

It is needless to say that such various changes and modifications are also encompassed in the technical scope of the present invention as defined in the appended claims.

What is claimed is:

1. An image-capturing system comprising:
    an image-capturing unit;
    an image storage unit for storing a camera position image of said image-capturing unit previously captured from an image-capturing region of said image-capturing unit, the camera position image showing the position of said image-capturing unit; and
    a remote control unit which allows the user to perform operation for remote control of said image-capturing unit,
    wherein said remote control unit includes a reception unit for receiving said camera position image stored in said image storage unit, and a display unit for displaying said camera position image received by said reception unit,
    wherein the image-capturing unit captures an image of the user using the remote control unit.

2. The image-capturing system according to claim 1, wherein said remote control unit further includes an image-capturing request unit for making a request to said image-capturing unit for image capturing.

3. The image-capturing system according to claim 1, further comprising:
    a position information storage unit for storing information regarding the position of said image-capturing unit in said camera position image,
    wherein said reception unit further receives said information regarding the position of said image-capturing unit stored in said position information storage unit, and
    wherein said display unit displays the position of said image-capturing unit based upon said information received by said reception unit, superimposed upon said camera position image received from said reception unit.

4. The image-capturing system according to claim 1, wherein said image storage unit stores said camera position image including a display indicating the position of said image-capturing unit, superimposed upon an image taken toward said image-capturing unit from said image-capturing region.

5. The image-capturing system according to claim 1, further comprising:
    an antenna unit for transmitting said camera position image stored in said image storage unit to said remote control unit in the form of a wireless signal,
    wherein said antenna unit is installed so as to enable transmission of said camera position image to said remote control unit which is present at a position where the user can visually confirm at least a part of an object included in said camera position image, in the form of a wireless signal.

6. The image-capturing system according to claim 5, wherein said antenna unit is installed in said image-capturing region.

7. The image-capturing system according to claim 1, wherein said image capturing unit is installed in a park.

8. The image-capturing system according to claim 1, wherein the remote control unit is a mobile terminal carried by the user.

9. The image-capturing system according to claim 1, wherein the remote control unit is fixed near the image capturing region.

10. An image-capturing method comprising:
    capturing an image by an image-capturing unit;
    storing a camera position image of said image-capturing unit previously captured from an image capturing region of said image-capturing unit, the camera position image showing the position of said image-capturing unit; and
    remotely controlling said image-capturing unit based on user operation, wherein said remotely controlling includes:
    receiving said camera position image stored in said image storage unit by a reception unit;
    displaying said camera position image received by said reception unit; and
    capturing an image of the user.

11. The image-capturing method according to claim 10, wherein the image capturing unit is installed in a park.

12. The image-capturing method according to claim 10, wherein image-capturing unit is remotely controlled by a mobile terminal carried by the user.

13. The image-capturing method according to claim 10, wherein image-capturing unit is remotely controlled by a remote control unit fixed near the image capturing region.

* * * * *